US008990782B2

(12) United States Patent  
Trinchini et al.

(10) Patent No.: US 8,990,782 B2  
(45) Date of Patent: Mar. 24, 2015

(54) INSTRUMENTATION OF SOFTWARE APPLICATIONS FOR CONFIGURATION THEREOF

(71) Applicant: International Business Machines Corporation, Armonk, NY (US)

(72) Inventors: Patrizio Trinchini, Sulmona (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 13/765,730

(22) Filed: Feb. 13, 2013

(65) Prior Publication Data

US 2013/0298109 A1  Nov. 7, 2013

(30) Foreign Application Priority Data

May 4, 2012 (GB) .................................. 1207851.5

(51) Int. Cl.  
*G06F 9/44* (2006.01)

(52) U.S. Cl.  
CPC ... *G06F 8/34* (2013.01); *G06F 8/71* (2013.01)  
USPC ........... 717/130; 717/121; 717/126; 717/127; 717/128; 717/129

(58) Field of Classification Search  
None  
See application file for complete search history.

(56) References Cited

U.S. PATENT DOCUMENTS

| | | | |
|---|---|---|---|
| 5,999,180 A * | 12/1999 | Coskrey, IV | 715/810 |
| 6,691,138 B1 * | 2/2004 | Kirkpatrick et al. | 713/1 |
| 6,981,135 B1 * | 12/2005 | Trask | 713/1 |
| 7,499,933 B1 * | 3/2009 | Simpson | 1/1 |
| 7,526,734 B2 * | 4/2009 | Vasilev et al. | 715/805 |
| 7,607,126 B2 * | 10/2009 | Read | 717/172 |
| 8,228,542 B2 * | 7/2012 | Coley et al. | 358/1.15 |
| 8,310,492 B2 * | 11/2012 | McCrary et al. | 345/522 |

(Continued)

FOREIGN PATENT DOCUMENTS

| | | | |
|---|---|---|---|
| WO | WO 2004/109501 | * | 12/2004 |
| WO | WO 2004109501 A3 | * | 4/2005 |

(Continued)

OTHER PUBLICATIONS

Doenhoff, Application No. GB1207851.5, Search Report, Aug. 21, 2012, 8 pages.

(Continued)

*Primary Examiner* — Isaac T Tecklu  
*Assistant Examiner* — Hossain Morshed  
(74) *Attorney, Agent, or Firm* — Douglas A. Lashmit; Hoffman Warnick LLC (57) ABSTRACT

A solution is proposed for instrumenting a software application for configuration thereof. A corresponding method includes scanning a source code of the software application for detecting an indication of a set of configuration parameters each one being identified by a pre-defined non-executable statement, creating a set of instances of a pre-defined configuration object each one mapping a corresponding one of the configuration parameters, the configuration object being designed to manage the corresponding configuration parameter, and creating a set of configuration interfaces for editing the configuration parameters, the configuration interfaces being operable to interact with each instance of the configuration object to get and set the corresponding configuration parameter.

11 Claims, 5 Drawing Sheets

(56) References Cited

U.S. PATENT DOCUMENTS

| | | | |
|---|---|---|---|
| 8,332,487 B2* | 12/2012 | Trace et al. | 709/219 |
| 8,484,631 B2* | 7/2013 | Mortensen | 717/162 |
| 8,533,597 B2* | 9/2013 | Evans et al. | 715/717 |
| 2003/0069956 A1* | 4/2003 | Gieseke et al. | 709/223 |
| 2003/0192027 A1* | 10/2003 | Porter | 717/100 |
| 2005/0222698 A1* | 10/2005 | Eryurek et al. | 700/90 |
| 2008/0134160 A1* | 6/2008 | Belapurkar et al. | 717/154 |
| 2008/0244506 A1* | 10/2008 | Killian et al. | 717/100 |
| 2009/0183092 A1* | 7/2009 | Naghshineh | 715/762 |
| 2009/0276270 A1* | 11/2009 | Karnataka | 705/8 |
| 2009/0276767 A1* | 11/2009 | Brannen et al. | 717/166 |
| 2010/0066408 A1* | 3/2010 | Kyouno et al. | 326/38 |
| 2010/0192127 A1* | 7/2010 | Son et al. | 717/121 |
| 2010/0223323 A1* | 9/2010 | Bhayani et al. | 709/203 |
| 2012/0023012 A1* | 1/2012 | Brousseau | 705/39 |
| 2012/0194320 A1* | 8/2012 | Yeakley et al. | 340/10.1 |
| 2013/0080649 A1* | 3/2013 | Trace et al. | 709/229 |
| 2014/0095829 A1* | 4/2014 | Mo et al. | 712/31 |

FOREIGN PATENT DOCUMENTS

| | | | |
|---|---|---|---|
| WO | 2007113539 A1 | | 10/2007 |
| WO | WO 2007113539 A1 * | | 10/2007 |

OTHER PUBLICATIONS

Hatfield et al., "Behind the Scenes of J2EE (TM) Deployment", Dec. 2000, 31 pages.

Red Hat, "JBoss", 2.3 Admin Console, http://docs.redhat.com/docs/en-US/JBoss_Enterprise_Web_Platform/5/htm, Jul. 27, 2011, 1 page.

Oracle, "Deploying and Customizing J2EE Applications Guide for Oracle Siebel eStatement Manager", Version 4.7, May 31, 2007, 57 pages.

Phillips, "Customize This: Tailoring Deployment Packages to Your Target Environments", Javalobby, http://java.dzone.com/articles/customize-tailoring-deployment, Jul. 17, 2010, 3 pages.

Morshed, Hossain, "Non-Final Office Action," U.S. Appl. No. 14/048,400, Jul. 17, 2014, 29 pages.

Morshed, Hossain, "Notice of Allowance," U.S. Appl. No. 14/048,400, Oct. 22, 2014, 17 pages.

* cited by examiner

INSTRUMENTATION OF SOFTWARE APPLICATIONS FOR CONFIGURATION THEREOF

TECHNICAL FIELD

The solution according to one or more embodiments of the present invention relates to the data processing field. More specifically, the solution relates to the configuration of software applications.

RELATED ART

Any software application generally requires some sort of configuration at run-time, so as to properly initialize its settings and/or vary its operation according to the actual context of the software application (without modifying its code); for example, this allows a system administrator to set network addresses/ports, enable/disable functions, select security levels, set user names and passwords, define authorizations, and the like.

For this purpose, a commonplace solution is to use a configuration file (or config file), which stores configuration parameters of the software application with their values (as parameter-value pairs). The configuration file is generally in the form of a text file, so that it may be modified manually by using a standard text editor. Alternatively, it is possible to exploit a dedicated user interface that may be provided by a general purpose tool (for example, as described in U.S. Pat. No. 6,691,138, the entire disclosure of which is herein incorporated by reference) or by a specific tool integrated in the software application itself.

A typical example is a software application conforming to the Java (trademark) Enterprise Edition (JEE) specification (previously called J2EE). The JEE specification defines a software framework, which provides a set of Application Program Interfaces (APIs) and a runtime environment simplifying the development of a variety of software applications. The software framework of the JEE specification (or JEE framework) defines a model for creating the software applications using components, which exploit services provided by common containers (so as to allow the developers to concentrate on the relevant business problems disregarding any side aspects thereof).

The current implementations of the JEE framework generally provide a management console for configuring the services of the containers. Examples include the Integrate Service Console (ISC) of the WebSphere by IBM Corporation (trademarks) or the Admin Console of the JBoss by RedHat (trademarks).

Each software application based on the JEE framework (or JEE application) may also comprise one or more deployment descriptors. Each deployment descriptor specifies the values of standard configuration parameters of the JEE application being pre-defined in the JEE specification (for example, resource references, security roles and transaction attributes). The containers are designed to get these standard configuration parameters from the deployment descriptors and to apply them by acting on the JEE application accordingly. The actual implementation of the JEE framework generally provides application development tools for editing the standard configuration parameters, for example, as described in "Behind the Scenes of J2EE™ Deployment, by Elizabeth Hatfield, Daniel Edwin, and Tom Kincaid" and in "Deploying and Customizing J2EE Applications Guide for Oracle Siebel eStatement Manager, by Oracle" (trademarks), the entire disclosures of which are herein incorporated by reference.

Alternatively, the value of the standard configuration parameters may also be defined as annotations directly in the code of the JEE application (so as to allow putting the setting of each standard configuration parameter close to the elements that it affects). In this case, the value of each standard configuration parameter as defined in the corresponding annotation may also be overridden by a further value thereof in the deployment descriptors (so as to avoid modifying the code of the JEE application), for example, as described in U.S. Pat. No. 7,607,126, the entire disclosure of which is herein incorporated by reference.

However, the JEE framework does not provide a comprehensive set of APIs for the whole management process of the other (custom) configuration parameters that are specific to each JEE application (i.e., for editing, getting, setting and applying them). In this case, a best practice is to use one or more property files of the JEE application that define the values of the custom configuration parameters (by means of corresponding properties). The JEE framework provides a standard way for referencing the property files, by defining a Uniform Resource Locator (URL) with appropriate scope for each property file (so as to make it independent of the specific context of the JEE application). In addition, in "Jgroups, JGRP-723, Use Java annotations to automatically set protocol properties, at https://issues.jboss.org/browse/JGRP-723" (the entire disclosure of which is herein incorporated by reference) the possibility has been suggested of using annotations and Java reflection to assign protocol property values to matching Java fields in a static way.

Nevertheless, each JEE application requires specific code for managing the custom configuration parameters. Usually, for this purpose the JEE application comprises a dedicated property manager consisting of a singleton component (i.e., with a single instance thereof at any time). The property manager accesses each property file via its URL, gets the value of each custom configuration parameter defined therein, and applies it to the JEE application. Likewise, additional code is required for implementing a user interface for editing the custom configuration parameters and setting them. Moreover, the custom configuration parameters are tightly coupled with the configuration manager, since it is statically referenced in the code of the JEE application for managing them.

A further drawback is due to the fact that the custom configuration parameters are usually static during a life-cycle of the JEE application. Indeed, the values of the custom configuration parameters are get and applied when the JEE application is started, so that they cannot be changed later on (without re-starting the JEE application). In addition, no relationship among the custom configuration parameters is usually implemented.

SUMMARY

In its general terms, the solution according to one or more embodiments of the present invention is based on the idea of automatically instrumenting the software application for its configuration.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies *mutatis mutandis* to every other aspect thereof).

More specifically, an aspect of the solution according to an embodiment of the invention provides a method for instrumenting a software application for its configuration, wherein a source code of the software application is scanned for detecting an indication of a set of configuration parameters; a set of instances of a pre-defined configuration object (each one for managing a corresponding configuration parameter) and a set of configuration interfaces (for editing the configuration parameters) are created.

Another aspect of the solution according to an embodiment of the invention provides a computer program for performing this method.

Another aspect of the solution according to an embodiment of the invention provides a corresponding system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings. For the sake of simplicity, corresponding elements are denoted with equal or similar references and their explanation is not repeated, and the name of each entity is generally used to denote both its type and its attributes, such as value, content and representation.

DETAILED DESCRIPTION

Figure 1:
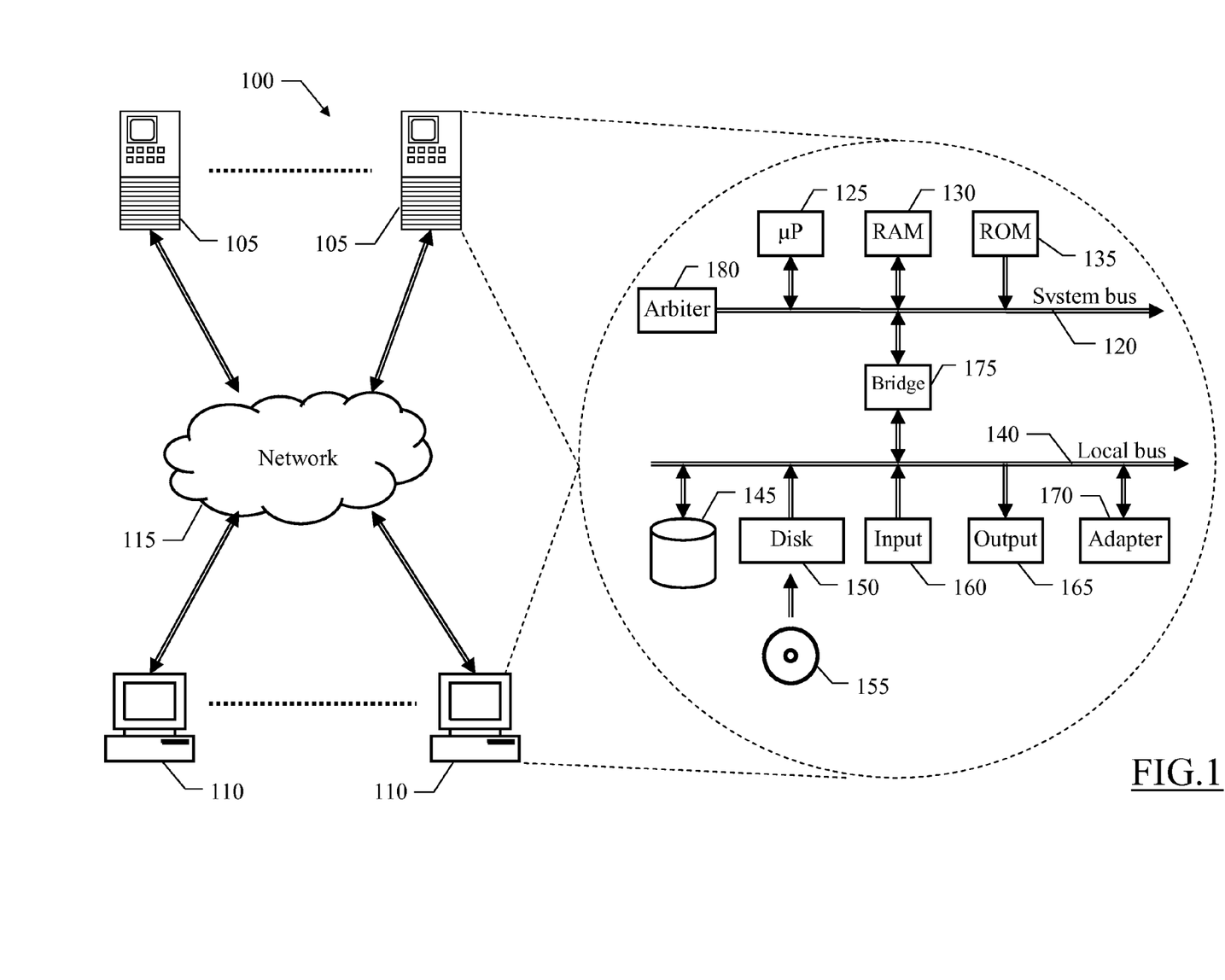
FIG. 1 shows a pictorial representation of a system wherein the solution according to an embodiment of the invention may be applied.

With reference in particular to the FIG. 1, a pictorial representation is shown of a system 100 wherein the solution according to an embodiment of the invention may be applied. The system 100 is based on a client/server model, wherein one or more server computers (or simply servers) 105 provide services to one or more client computers (or simply clients) 110. Typically, the system 100 has a distributed architecture with the servers 105 and the clients 110 that communicate among them over a network 115 (for example, Internet-based).

Each (server or client) computer comprises several units that are connected in parallel to a system bus 120 (with a structure that is suitably scaled according to the actual function of the computer in the system 100). In detail, one or more microprocessors (µP) 125 control operation of the computer; a RAM 130 is used as a working memory by the microprocessors 125, and a ROM 135 stores basic code for a bootstrap of the computer. Several peripheral units are clustered around a local bus 140 (by means of respective interfaces). Particularly, a mass memory comprises one or more hard-disks 145 and drives 150 for reading/writing optical disks 155 (for example, CDs or DVDs). Moreover, the computer comprises input units 160 (for example, a keyboard and a mouse), and output units 165 (for example, a monitor). A network adapter 170 is used to connect the computer to the network 115. A bridge unit 175 interfaces the system bus 120 with the local bus 140. Each microprocessor 125 and the bridge unit 175 may operate as master agents requesting an access to the system bus 120 for transmitting information. An arbiter 180 manages the granting of the access with mutual exclusion to the system bus 120.

Figure 2:
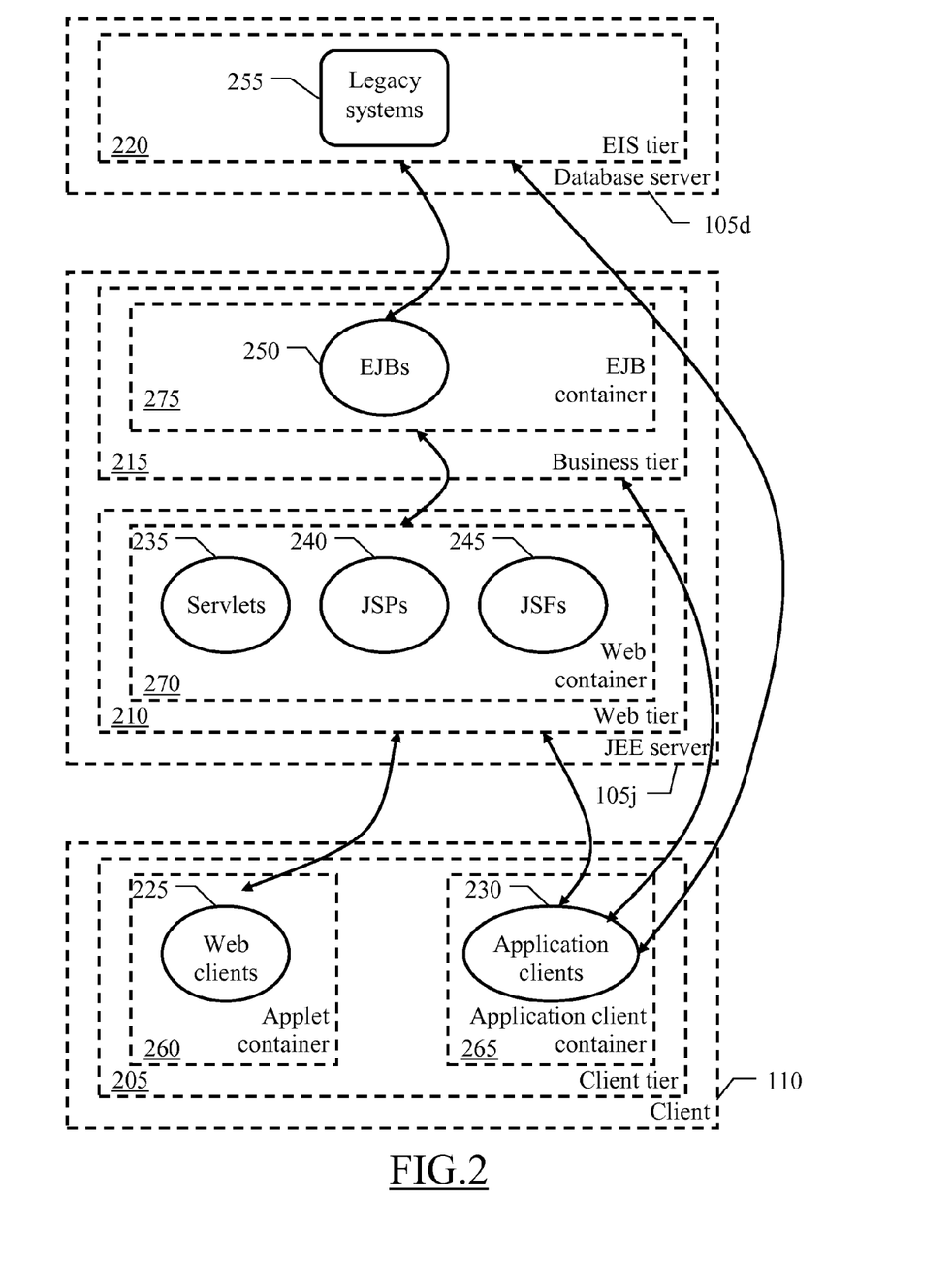
FIG. 2 shows the software components that may be used to implement the solution according to an embodiment of the invention.

Software components that may be used to implement the solution according to an embodiment of the invention are shown in the FIG. 2. The information (programs and data) is typically stored on the hard-disk and loaded (at least partially) into the working memory of each computer when the programs are running, together with an operating system and other application programs (not shown in the figure). The programs are initially installed onto the hard disk, for example, from optical disks.

Particularly, the above-described system runs JEE applications, each one having a multi-tier architecture based on components that exploit services provided by common containers. Typically, the JEE application is three-tiered since it is distributed on a client 110 implementing a client tier 205, on a server implementing a web tier 210 and a business tier 215 (referred to as JEE server 105$j$), and on another server implementing an Enterprise Information System (EIS) tier 220 (referred to as database server 105$d$).

Each component consists of a self-contained software module performing a specific function, which component is written in the Java programming language by Oracle (trademarks) and is complaint with the JEE specification.

More specifically, the client 110 may run corresponding components that consist of either web clients 225 or application clients 230. Each web client 225 is used to interact with the business tier 215 through the web tier 210 by means of web pages (i.e., hypertext documents formatted in the HTML language being accessed through a web browser), which may comprise applets (i.e., small programs intended to run in the web browser). On the other hand, each application client 230 is used to interact with the business tier 215 (either through the web tier 210 or directly) by means of a richer set of commands, typically implemented as a dedicated Graphical User Interface (GUI).

The web tier 210 of the JEE server 105$j$ may run corresponding components that consist of either Java servlets 235 (i.e., small programs that are persistent and may satisfy multiple requests through corresponding threads running in a single process), JavaServer Pages (JSPs) 240 (i.e., web pages that are capable of generating servlets automatically), or JavaServer Faces (JSFs) 245 (i.e., web application frameworks built on servlets and JSPs). The business tier 215 of the JEE server 105$j$ may instead run corresponding components that consist of Enterprise JavaBeans (EJBs) 250. Each EJB 250 is a Java bean (i.e., an object complying with preset specifications), which is used to perform specific operations in the relevant business domain of the JEE application (such as bank, insurance, or retail organizations). The EJB 250 may be a session bean (which manages transient sessions with the client 110) or a message-driven bean (which adds message listening capabilities to the session bean to allow receiving messages asynchronously from the client 110).

At the end, the database server 105$d$ runs legacy systems 255, typically managing the access to one or more databases. The legacy systems 255 process requests from the EJBs 250 or from the application clients 230. For this purpose, the JEE specification defines Java persistent API entities, each one representing persistent data in a database (replacing entity beans available in the J2EE specification).

On the other hand, a container consists of an interface between components of a corresponding type and the underlying software environment. In other words, the container provides the low-level functionalities (specific to each software environment) that support its components. Typical examples of these functionalities comprise message exchange, scheduling, pooling, error handling, and the like. Particularly, the container is responsible for forwarding requests and corresponding responses correctly (according to a corresponding mapping of the relevant components).

Considering in particular the client 110, an applet container 260 manages the execution of the web clients 225. Typically, the applet container 260 consists of a web browser (for retrieving, displaying and interacting with the web pages) that comprises a Java Virtual Machine, or JVM (for running the applets). Likewise, an application client container 265 manages the execution of the application clients 230. Typically, the application client container 265 consists of a Java Runtime Environment (JRE). Moving to the JEE server 105j, in the web tier 210 a web container 270 manages the execution of the servlets 235, JSPs 240 and JavaServer Faces 245, whereas in the business tier 215 an EJB container 275 manages the execution of the EJBs 250.

The JEE application is packaged into JEE modules. Each JEE module comprises one or more components for the same container. Particularly, application client modules comprise web clients 225 and/or application clients 230, web modules comprise Java servlets 235, JSPs 240 and/or JavaServer Faces 245, EJB modules comprise EJBs 250, and resource adapter modules comprise any resources required to connect to the legacy systems 255. The modules are in turn bundled into an Enterprise Archive (EAR) file, together with optional deployment descriptors. The deployment descriptors are files in the XML format containing information about the configuration of the components of a respective module or of the whole JEE application. The deployment descriptors may be JEE deployment descriptors (specifying the values of standard configuration parameters pre-defined in the JEE specification) or runtime deployment descriptors (specifying custom configuration parameters specific to the JEE application). Alternatively, the value of the standard configuration parameters may also be defined as annotations directly in the code of the JEE application. An annotation is a non-executable statement appearing in the source code of the JEE application, which provides information about the JEE application (for example, for use by a compiler or other tools). The annotation is identified by the symbol @ followed by its name; the annotation may also comprise one or more elements, each one consisting of either a value or a pair name/value (according to a type of the annotation defined in a corresponding interface).

Figure 3:
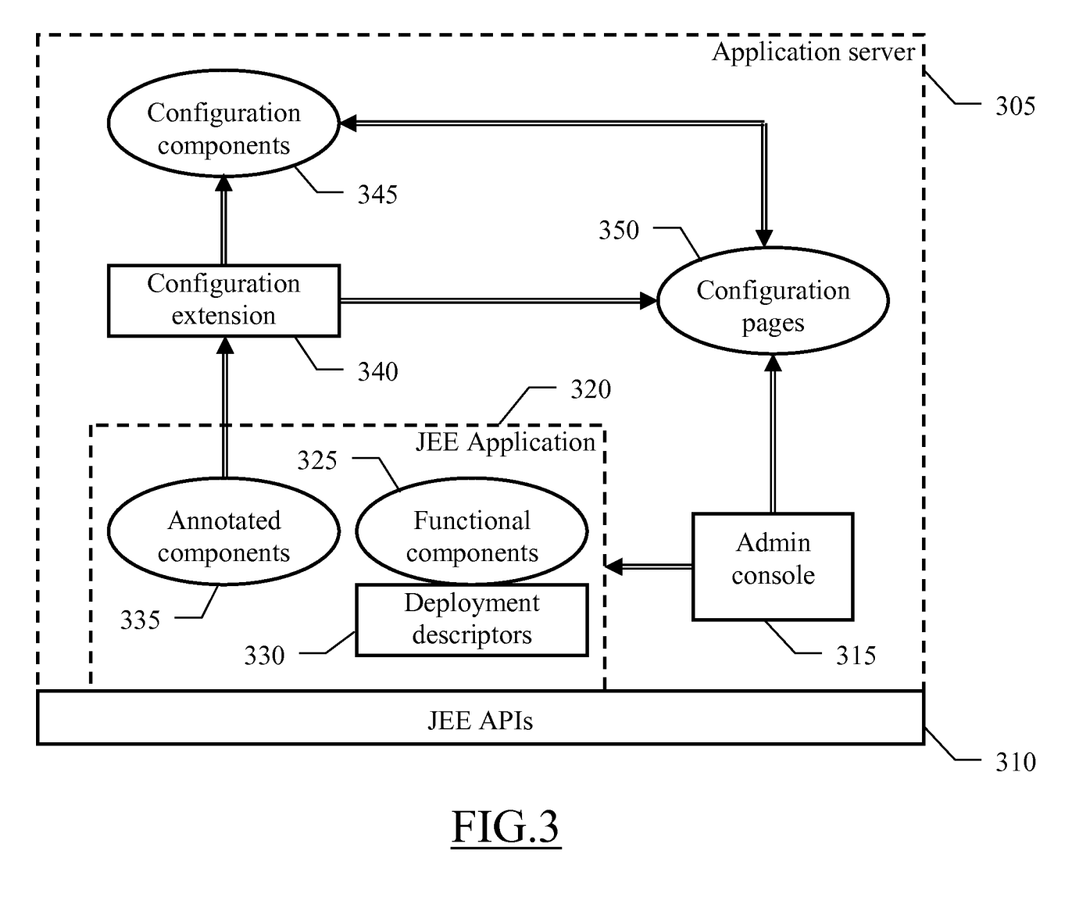
FIG. 3 shows an example of implementation of the solution according to an embodiment of the invention.

An example of implementation of the solution according to an embodiment of the invention is shown in the FIG. 3. As above, the information (programs and data) is stored on the hard-disk and loaded (at least partially) into the working memory of the corresponding computer when the programs are running, together with an operating system and other application programs (not shown in the figure). The programs are initially installed onto the hard disk, for example, from optical disks.

An application server 305 implements the above-described JEE framework by providing the APIs defined by the JEE specification (comprising the web container and the EJB container), generically denoted with the reference 310. Moreover, the application server 305 may provide additional tools (being not defined in the JEE specification), which are useful to manage the JEE applications. Particularly, the application server 305 typically has an admin console 315 with a web-based GUI, which may be used to configure, start and stop the JEE applications. Examples of the application server 305 are the above-mentioned WebSphere and JBoss, and the TomCat by Apache Software Foundation (trademarks).

A generic JEE application 320, comprising the corresponding components 325 and possible deployment descriptors 330, is deployed onto the application server 305. For this purpose, a system administrator adds the components 325 and the descriptors 350 to the application server 305. The system administrator then configures the JEE application 320 as usual, by properly setting the standard configuration parameters thereof through the admin console 315.

In the solution according to an embodiment of the invention, the custom configuration parameters are defined by corresponding annotations of the source code of the JEE application 320. For example, the JEE application 320 may comprise one or more additional components 335 (such as a Java beans), referred to as annotated components 335 to distinguish them from the components 325 defining the functionalities of the JEE application (referred to as functional components).

The application server 305 has a configuration extension 340, which scans the annotated components 335 for detecting any annotations defining corresponding custom configuration parameters. For each custom configuration parameter, the configuration extension 340 dynamically creates an object (for example, a Java bean), which consists of a corresponding instance of a pre-defined configuration class mapping the custom configuration parameter (referred to as configuration component 345). The configuration class is designed to have fields identifying the corresponding custom configuration parameter (to be applied to the functional components 325) and its value, initially set to a default value (passed by the configuration extension 340 at its instantiation). The configuration class also has methods for getting the value of the custom configuration parameter, and for setting the value of the custom configuration parameter (and making it persistent, for example, in a file). Moreover, the configuration extension 340 dynamically creates one or more user interfaces for updating the custom configuration parameters. For example, it is possible to provide configuration web pages (or simply configuration pages) 350 with predefined management code interacting with the configuration components 345 (such as based on the Java Management Extensions (JMX) standard), which configuration pages 350 are controlled by the admin console 315.

The solution according to an embodiment of the invention does not require any specific code for managing the custom configuration parameters and for editing them. Therefore, the JEE application may be automatically instrumented for its configuration, thereby strongly facilitating it. Indeed, the developers now only have to annotate the components and their variables that represent the custom configuration parameters (while the implementation of the details about the whole management of the custom configuration parameters is now completely opaque to the developers).

Particularly, the specific embodiment described above further makes the management of the custom configuration parameters more consistent between the application server 305 and the JEE application 320. Indeed, in this case the system administrator may use the same admin console 315 to edit the configuration parameters that are both generic for the application server 305 and specific for the JEE application 320.

For example, a generic annotated component may instantiate a class myAnnotatedComponent. In the class myAnnotatedComponent, each custom configuration parameter is defined by a field, which is assigned a corresponding default value (for example, the custom configuration parameters myParameter1 and myParameter2 with the default values myValue1 and myValue2, respectively). The custom configuration parameter is identified by a predefined (parameter) annotation @ Property, which has three pairs name/value comprising an element name for a name of the custom configuration parameter (i.e., myName1 and myName2, respectively), an element description for an explanatory description of the custom configuration parameter (i.e., myDescription1 and myDescription2, respectively), and an element changeProcess for a mode of update that is supported by the custom configuration parameter (for example, set to the keyword configuration for a cold mode requiring the re-start of the JEE application or to the keyword runtime for a warm mode being possible even while the JEE application is running). The annotation @ Property may also comprise an (optional) element validation for a validation rule, or more, of the custom configuration parameter (such as a range of valid values thereof, expressed either in absolute terms or as a function of the values of other custom configuration parameters). For example, the value of the custom configuration parameter myParameter1 should be comprised between myLowLimit1 and myHighLimit2, whereas the value of the custom configuration parameter myParameter2 should be lower than twice the value of the custom configuration parameter myParameter1. Preferably, related custom configuration parameters are grouped into sections, identified by a predefined (section) annotation @ PropertyManager—for example, for the above-mentioned custom configuration parameters myParameter1 and myParameter2:

```
@PropertyManager
class myAnnotatedComponent {
    @Property(name=myName1
    description=myDescription1
    changeProcess= "runtime"
    validation="">myLowLimit1 AND <myHighLimit2")
    myParameter1 = myValue1;
    @Property(name=myName2
    description=myDescription2
    changeProcess= "configuration"
    validation="<2*myParameter1")
    myParameter2 = myValue2;
}.
```

For example, the custom configuration parameter myParameter1 may be a timeout (which may be updated in the warm mode) and the custom configuration parameter myParameter2 may be a port number (which may be updated in the cold mode only).

For each custom configuration parameter supporting the updating in cold mode (changeProcess="runtime"), a corresponding application method is also provided. The application method is identified by a predefined (application) annotation @ onPropertyChange with an element property for its custom configuration parameter. The application method comprises the instructions (specific to the JEE application) to be executed to apply the custom configuration parameter when it is updated (for example, re-loading connections, tables, and the like). In the example at issue, the class myAnnotatedComponent comprises an application method Apply1 for the custom configuration parameter myParameter1 (returning an integer indicating a result of its application):

```
@onPropertyChange(property=myProperty1)
    private int Apply1( ) {
    ...
    }.
```

The configuration pages are built so as to display the name and the description of each custom configuration parameter (extracted from the corresponding elements name and description, respectively) together with its current value (set to the default value at the beginning). A different configuration page may be provided for each section of custom configuration parameters (so as to facilitate their management).

As a further improvement, the annotated components may be arranged in a hierarchical structure as provided natively by the Java language. For this purpose, the custom configuration parameters are defined in multiple annotated components. Some of these annotated components extend some other of the annotated components (directly or indirectly) so as to inherit their characteristics. In this case, the configuration pages associated with the custom configuration parameters of the different annotated components are organized into a corresponding tree (according to their dependencies). This provides an immediate visual representation of the corresponding hierarchical structure of the custom configuration parameters. For example, it is possible to implement a breadcrumb representation, wherein each configuration page comprises a chain of links back to its parent configuration pages in the hierarchical structure.

Figure 4A:
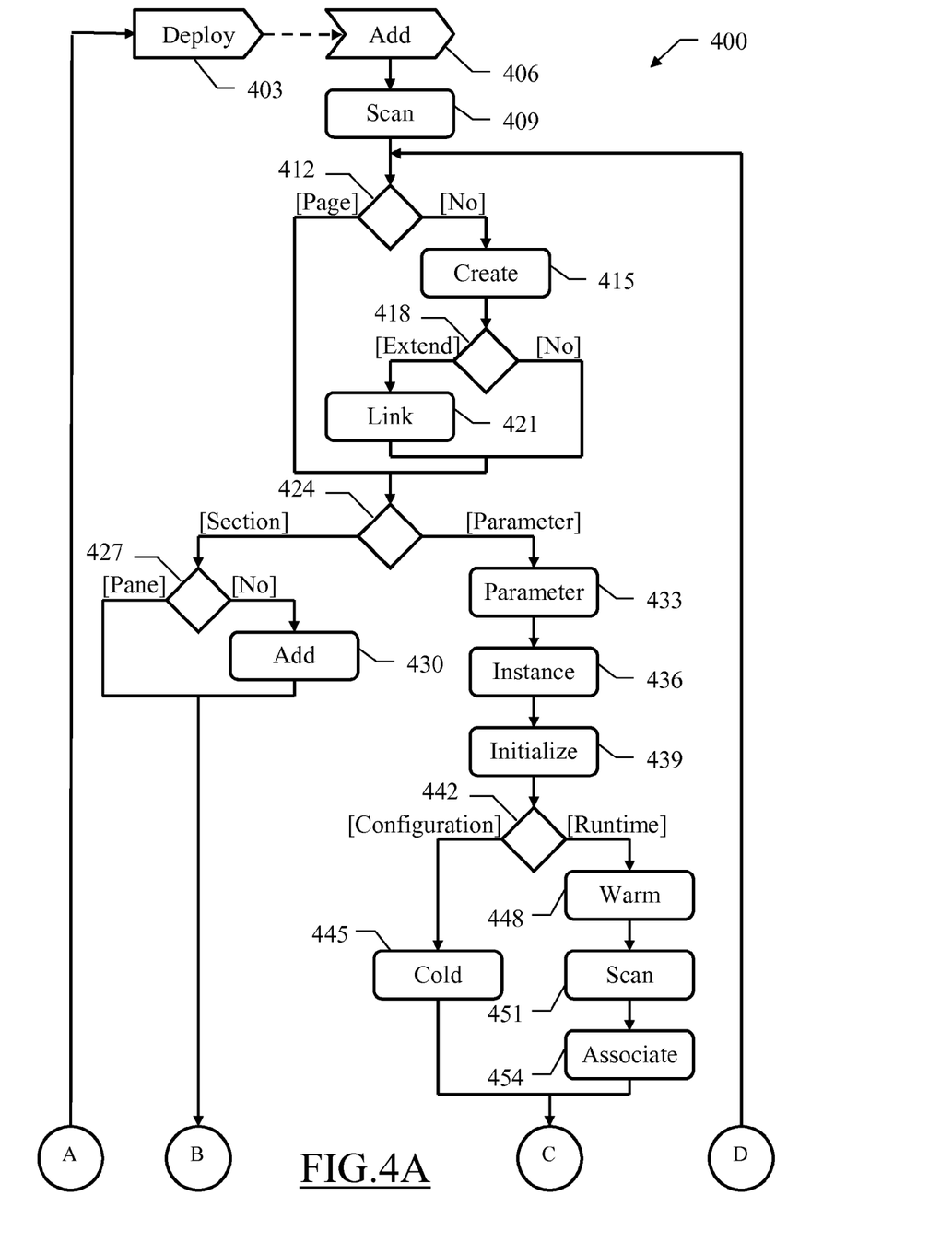
FIG. 4A-FIG. 4B show an activity diagram describing the flow of activities relating to an implementation of the solution according to an embodiment of the invention.
Figure 4B:
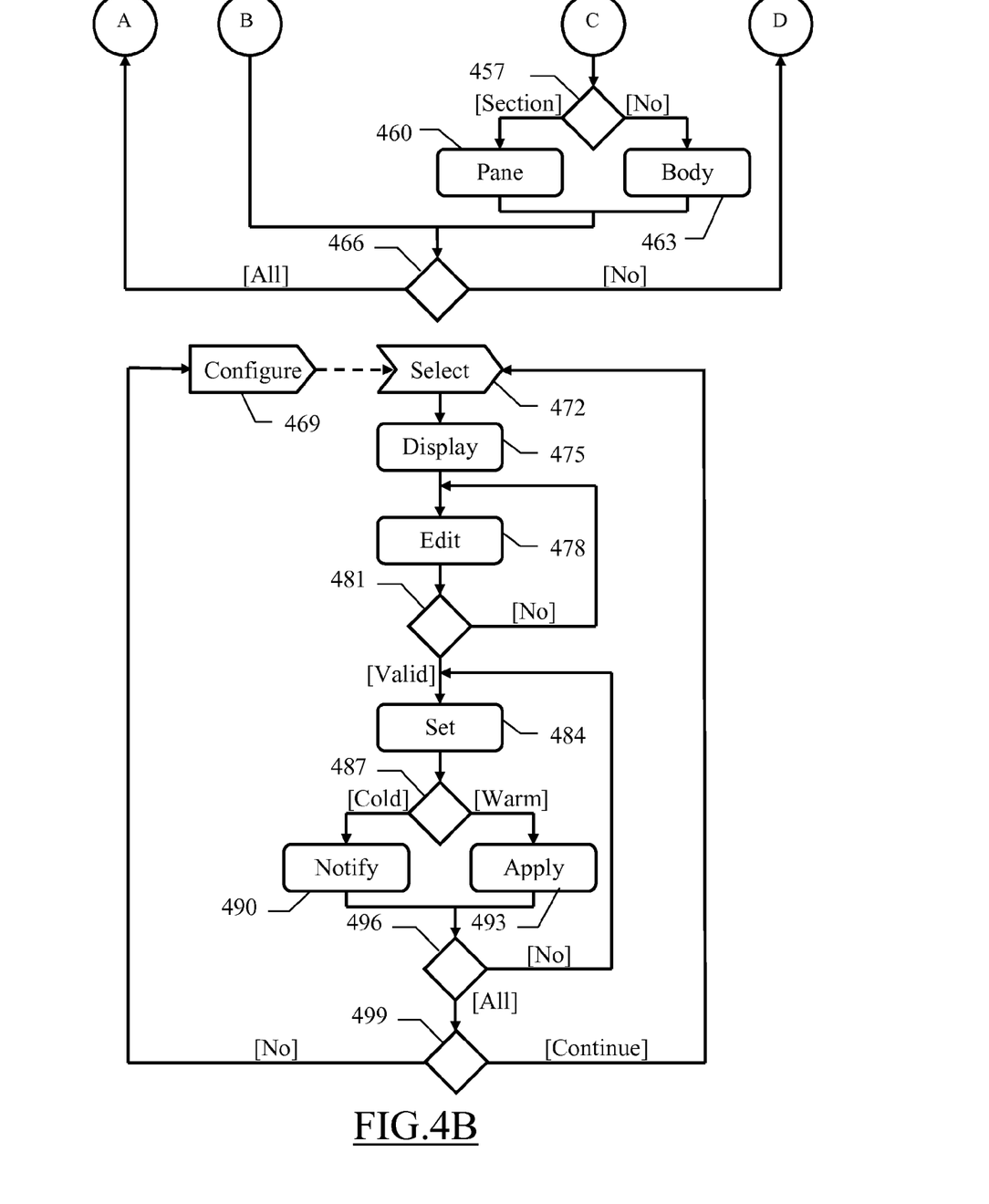

With reference now to the FIG. 4A-FIG. 4B, an activity diagram is shown describing the flow of activities relating to an implementation of the solution according to an embodiment of the invention. In this respect, each block in the diagram may represent a module, segment, or portion of code, which comprises one or more executable instructions for implementing the specified logical function(s).

Particularly, the diagram represents an exemplary process that may be implemented in the above-described system for automatically instrumenting a generic JEE application for its configuration with a method 400.

The method passes from block 403 to block 406 when the JEE application is deployed onto the application server. In this phase, the (functional and annotated) components with the possible deployment descriptors of the JEE application are added to the application server. Moreover, the system administrator configures the standard configuration parameters of the JEE application through the admin console as usual.

In the solution according to an embodiment of the invention, the configuration extension of the application server at block 409 scans the source code of the JEE application for detecting the annotations relevant to the instrumentation thereof. A loop is then performed for processing each detected annotation (starting from the first one). The loop begins at block 412, wherein a test is made to verify whether a configuration page already exists for the annotated component wherein this annotation has been found. If not, at block 415 a new configuration page is created and integrated into the admin console. A test is then made at block 418 to verify whether the annotated component extends another (parent) annotated component. If so, at block 421 the newly created configuration page is linked to the configuration page of the parent annotated component. The method then descends into block 424. The same point is also reached directly from the block 412 (if the configuration page of the annotated component already exists) or from the block 418 (if the class of the annotated component does not extend the class of any other annotated component). The flow of activity then branches according to the type of annotation.

Particularly, if the annotation is a section annotation (i.e., @ PropertyManager), the blocks 427-430 are executed, whereas if the annotation is a parameter annotation (i.e., @

Property) the blocks 433-463 are executed. In both cases, the method merges again at block 466.

With reference in particular to block 427 (section annotation), a test is made to verify whether a tabbed pane already exists for the section in the configuration page for the annotated component of the annotation. If not, at block 430 a new tabbed pane is added to this configuration page for the corresponding section. The method then descends into block 466; the same point is also reached directly from the block 427 otherwise.

With reference instead to block 433 (parameter annotation), the corresponding custom configuration parameter is detected (as immediately following the annotation). Continuing to block 436, the configuration extension creates a new configuration component (by instantiating the configuration class). This configuration component is initialized at block 439 so as to map the custom configuration parameter (for example, with a field dedicated to the management of a generic custom configuration parameter that is assigned thereto with the possible default value indicated in the annotated component). Moreover, further fields of the configuration component are initialized according to the name and the description of the custom configuration parameter as defined in the corresponding elements of the annotation (i.e., name and description, respectively). The method then branches at block 442 according to the value of the changeProcess element of the custom configuration parameter. Particularly, if the changeProcess element has the value configuration, the configuration component is initialized at block 445 so as to apply the custom configuration parameter in the cold mode (for example, by asserting a corresponding flag). Conversely, if the changeProcess element has the value runtime, the configuration component is initialized at block 448 so as to apply the custom configuration parameter in the warm mode (for example, by de-asserting the same flag). In this case, the source code of the JEE application is scanned for detecting the corresponding application annotation (i.e., @ onPropertyChange with the element property indicating the custom configuration parameter). The application method of the application annotation (immediately following it) is then associated with the configuration component at block 454 (for example, by setting a corresponding field accordingly).

The flow of activity descends into block 457 either from the block 445 or from the block 454. In this phase, a test is made to determine whether the parameter annotation is preceded by a section annotation (in the same annotated component). If so, at block 460 a new input field for the custom configuration parameter (with a label set to its name and description) is added to the tabbed pane of the corresponding section (in the configuration page of the annotated component). The input field is associated with the validation rule of the custom configuration parameter, if any (as indicated in the element validation). Conversely, at block 463 the same input field is added directly to the body of the configuration page of the annotated component. In any case, the method then descends into block 466.

A test is then made to verify whether all the custom configuration parameters have been processed. If not, the method returns to the block 412 to repeat the same operations for a next custom configuration parameter; conversely, the method returns to the block 403 waiting for the deployment of a further JEE application.

In a completely asynchronous way, the method passes from block 469 to block 472 when the system administrator needs to configure the JEE application. In this phase, the admin console displays a tree representation of the hierarchical structure of the configuration pages, so as to allow the system administrator to navigate through this tree representation for selecting any desired configuration page. Continuing to block 475, the (selected) configuration page is displayed within the admin console. Particularly, for each input field of the configuration page, the configuration page invokes the corresponding configuration component for getting the current value of its custom configuration parameter. The admin console may also add breadcrumbs to the configuration page (providing links back to any previous configuration page in the hierarchical structure).

Continuing to block 478, the system administrator may edit one or more custom configuration parameters of the configuration page. For each custom configuration parameter that has been edited, a pre-defined validating method of the corresponding configuration page is invoked at block 481 by passing its validation rule (if any). If the new value of the custom configuration parameter is not complaint with the validation rule, the method returns to the block 478 requesting the system administrator to correct it. Once the updates to the custom configuration parameters have been validated and accepted, the method descends into block 484. A loop is then performed for processing each (updated) custom configuration parameter (starting from the first one); for this purpose, the configuration page invokes the corresponding configuration component for setting the new value of its custom configuration parameter. In response thereto, the new value of the custom configuration parameter is made persistent. Continuing to block 487, the flow of activity branches according to the initialization of the configuration component. Particularly, if the configuration component has been initialized to apply the corresponding custom configuration parameter in the cold mode, the system administrator is notified at block 490 that the new value of the custom configuration parameter will be applied at a next re-start of the JEE application. Conversely, the configuration component applies the new value of the custom configuration parameter to the JEE application at block 493; for this purpose, the configuration component invokes its application method (as indicated in the corresponding field). In this way, the JEE application is notified of the update to the custom configuration parameter, and it reacts accordingly.

In both cases, a test is then made at block 496 to verify whether all the updated custom configuration parameters have been processed. If not, the method returns to the block 484 to repeat the same operations for a next updated custom configuration parameter. Conversely, the method branches at block 499. In this phase, if the system administrator needs to continue the configuration of the JEE application, the method returns to the block 472 for repeating the same operations described above; conversely, the method returns to the block 469 waiting for a next configuration of the same or another JEE application.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for instrumenting a software application for configuration thereof. The method comprises the following steps. A source code of the software application is scanned for detecting an indication of a set of (one or more) configuration parameters, each one being identified by a pre-defined non-executable statement. A set of instances of a pre-defined configuration object is created, each one mapping a corresponding one of the configuration parameters. The configuration object is designed to manage the corresponding configuration parameter. A set of (one or more) configuration interfaces is created for editing the configuration parameters. The configuration interfaces is operable to interact with each instance of the configuration object to get and set the corresponding configuration parameter.

However, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

In any case, as detailed below, the same method may be applied to any software application, and to any configuration parameter identified by any non-executable statement. Likewise, it is possible to create instances of any configuration object, and to create any configuration interfaces.

In an embodiment of the invention, the software application comprises a set of (one or more) software components that are adapted to run in a set of (one or more) software containers of an application server. Each software container is for interfacing the software components of a corresponding type with a software environment of a data processing server. The steps of the method are executed under the control of the application server in response to a deployment of the software application on the data processing server.

However, either the components or the containers may be of any type; in any case, the same method may be executed in any context (for example, when the software application is compiled or packaged).

In an embodiment of the invention, the software application is a JEE software application and the application server is a JEE application server. Each non-executable statement is an annotation and each configuration interface is a web page.

However, nothing prevents applying the same method to any other software framework (for example, the ASP.NET by Microsoft Corporation—trademarks); moreover, the annotations may be replaced by any other non-executable statements (for example, comments) and/or the web pages may be replaced by any other configuration interfaces (even of the command-line type).

In an embodiment of the invention, the application server comprises an administration console for configuring the application server and further configuration parameters of the software application (which are pre-defined in the application server); the step of creating a set of configuration interfaces comprises integrating the configuration interfaces into the administration console.

However, the possibility of managing the configuration interfaces independently of any administration console is not excluded (for example, when it is not available in the application server).

In an embodiment of the invention, the software application comprises a plurality of dedicated ones of the components comprising the non-executable statements. At least one of the dedicated components extends another one of the dedicated components. The step of creating a set of configuration interfaces comprises creating a plurality of configuration interfaces each one for the configuration parameters of a corresponding one of the dedicated components. The configuration interfaces are arranged in a hierarchical structure according to the extensions of the dedicated components.

However, nothing prevents organizing the configuration parameters in any other way (down to a completely horizontal structure, even with a single configuration interface for all the configuration parameters). In any case, the configuration parameters may be defined elsewhere in the source code of the software application (for example, directly in the functional components where they are used).

In an embodiment of the invention, the step of scanning a source code of the software application further comprises scanning the source code for detecting a set of sections of configuration parameters, each one identified by a pre-defined further non-executable statement. The step of creating a set of configuration interfaces comprises grouping the configuration parameters of each section in the configuration interfaces.

However, the sections may be defined in any other way (for example, by corresponding attributes of the non-executable statements identifying the configuration parameters). In any case, nothing prevents treating all the configuration parameters indistinctly without any grouping thereof.

In an embodiment of the invention, the configuration interfaces are window forms; the configuration parameters of each section are grouped in a corresponding panel of the window forms.

However, the sections may be managed in any other way (for example, by means of frames, pop-up windows, and the like).

In an embodiment of the invention, the step of creating a set of configuration interfaces comprises associating a set of (zero, one or more) validation rules indicated in the corresponding non-executable statement with each configuration parameter in the configuration interfaces. The configuration interfaces is operable to invoke a predefined validation method in response the an editing of each configuration parameter for validating the configuration parameter according to the associated validation rules (if any).

However, the validation rules may be of any type (for example, listing allowable values), and in any number (down to be omitted at all).

In an embodiment of the invention, at least one of the validation rules constraints the corresponding configuration parameter according to at least another one of the configuration parameters.

However, the configuration parameters may be constrained in any other way (for example, according to run-time measurements).

In an embodiment of the invention, the step of creating a set of instances of a pre-defined configuration object comprises initializing each instance of the configuration object for applying the corresponding configuration parameter to the software application in a cold mode or in a warm mode when the corresponding non-executable statement comprises a pre-defined cold indicator or a predefined warm indicator, respectively.

However, the cold/warm indicator may be provided in any way (for example, by means of further annotations), or different configuration modes of the software application may be supported (down to a single one of them). It is also possible to provide additional or alternative information for each custom configuration parameter (for example, rules for automatically updating the configuration parameters according to run-time measurements, such as workload or transaction time, to react to abnormal conditions or to tune the software application accordingly).

In an embodiment of the invention, the step of initializing each instance of the configuration object comprises initializing the instance of the configuration object for each configuration parameter to be applied in the warm mode to invoke a corresponding application method in response to an update of the configuration parameter.

However, the application of the configuration parameters in the warm mode may be implemented in another way (for example, with polling techniques).

In an embodiment of the invention, the step of initializing the instance of the configuration object for each configuration parameter to be applied in the warm mode comprises the following operations. The source code of the software application is scanned for detecting the corresponding application method being identified by a pre-defined still further non-executable statement comprising an identifier of the configuration parameter. The application method is associated with the corresponding instance of the configuration object.

However, the application method may be associated with the corresponding configuration parameter in any way (for example, directly within its non-executable statement).

Another embodiment of the present invention provides a computer program, which comprises program code for causing a data processing system to perform the steps of the above-described method when the computer program is executed on the data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like (trademarks) and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the present invention provides a system comprising means for performing the steps of the same method.

However, similar considerations apply if the system has a different structure or comprises equivalent units, or it has other operative characteristics. In any case, every unit thereof may be separated into more elements, or two or more units may be combined together into a single element; moreover, each unit may be replicated to support the execution of the corresponding operations in parallel. It is also pointed out that (unless specified otherwise) any interaction between different units generally does not need to be continuous, and it may be either direct or indirect through one or more intermediaries. In any case, the system (for example, the server) may have another structure or may comprise similar elements (such as cache memories temporarily storing the programs or parts thereof); moreover, it is possible to replace the server with any code execution entity, either based on a physical machine or a virtual machine, or with a combination of multiple entities (such as a multi-tier architecture, a grid computing infrastructure, and the like). More generally, the same method may also be carried out on a system based on a different architecture (for example, a local, wide area, global, cellular or satellite network), and exploiting any type of (wired and/or wireless) connections. However, its implementation on a stand-alone computer (implementing both the servers and the clients) is not excluded.

The invention claimed is:

1. A computer implemented system for performing a method for instrumenting a JEE software application for configuration thereof, the method comprising:
   one or more processors and memory units;
   Scanning, by a computing device, a source code of the JEE software application for detecting an indication of a set of configuration parameters, each configuration parameter being identified by a pre-defined non-executable statement comprising an annotation,
   creating a set of instances of a pre-defined configuration object, each configuration object comprising a corresponding instance of a predefined configuration class mapping a corresponding one of the configuration parameters identified by the pre-defined non-executable statement in the source code of the JEE software application, the configuration object being designed to manage the corresponding configuration parameter, and
   creating a set of configuration interfaces, each configuration interface comprising a web page, for editing the configuration parameters, the configuration interfaces being operable to interact with each instance of the configuration object to get and set the corresponding configuration parameter.

2. The system according to claim 1, wherein the software application comprises a set of software components adapted to run in a set of software containers of a JEE application server each one for interfacing the software components of a corresponding type with a software environment of a data processing server, the method being executed under the control of the application server in response to a deployment of the software application on the data processing server.

3. The system according to claim 2, wherein the application server comprises an administration console for configuring the application server and further configuration parameters of the software application being pre-defined in the application server, the creating the set of configuration interfaces comprising:
   integrating the configuration interfaces into the administration console.

4. The system according to claim 2, wherein the software application comprises a plurality of the components comprising the non-executable statements with at least one of the components extending another one of the components, the creating the set of configuration interfaces comprising:
   creating a plurality of configuration interfaces each one for the configuration parameters of a corresponding one of the components, the configuration interfaces being arranged in a hierarchical structure according to the extensions of the components.

5. The system according to claim 1, wherein the scanning the source code of the software application further comprises:
   scanning the source code for detecting a set of sections of configuration parameters each one being identified by a pre-defined further non-executable statement,
   and
   wherein the creating the set of configuration interfaces comprises:
   grouping the configuration parameters of each section in the configuration interfaces.

6. The system according to claim 5, wherein the configuration interfaces are window forms, the configuration parameters of each section being grouped in a corresponding panel of the window forms.

7. The system according to claim 1, wherein the creating the set of configuration interfaces comprises:
   associating a set of validations rule indicated in the corresponding non-executable statement with each configuration parameter in the configuration interfaces, the configuration interfaces being operable to invoke a predefined validation method in response the an editing of each configuration parameter for validating the configuration parameter according to the associated validation rules.

8. The system according to claim 7, wherein at least one of the validation rules constrains the corresponding configuration parameter according to at least another one of the configuration parameters.

9. The system according to claim 1, wherein the creating the set of instances of a pre-defined configuration object comprises:
   initializing each instance of the configuration object for applying the corresponding configuration parameter to the software application in a cold mode or in a warm mode when the corresponding non-executable statement comprises a pre-defined cold indicator or a predefined warm indicator, respectively.

10. The system according to claim 9, wherein the initializing each instance of the configuration object comprises:
    initializing the instance of the configuration object for each configuration parameter to be applied in the warm mode to invoke a corresponding application method in response to an update of the configuration parameter.

11. The system according to claim 10, wherein the initializing the instance of the configuration object for each configuration parameter to be applied in the warm mode comprising:
    scanning the source code of the software application for detecting the corresponding application method being identified by a pre-defined still further non-executable statement comprising an identifier of the configuration parameter, and
    associating the application method with the corresponding instance of the configuration object.

* * * * *